(12) United States Patent
Clavaud et al.

(10) Patent No.: US 7,295,927 B2
(45) Date of Patent: Nov. 13, 2007

(54) DETERMINING WATER SATURATION FOR OIL BEARING THIN-BEDDED FORMATION HAVING ANISOTROPIC RESISTIVITY

(75) Inventors: Jean-Baptiste Nicolas Clavaud, Houston, TX (US); Austin Joseph Boyd, Ridgefield, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/939,179

(22) Filed: Sep. 9, 2004

(65) Prior Publication Data

US 2005/0114029 A1    May 26, 2005

Related U.S. Application Data

(60) Provisional application No. 60/503,112, filed on Sep. 15, 2003.

(51) Int. Cl.
*G01V 1/40* (2006.01)
*E21B 49/00* (2006.01)

(52) U.S. Cl. ........................................ 702/7; 73/152.08
(58) Field of Classification Search .................... 702/7, 702/11, 12, 14, 13; 367/73, 14; 703/10; 324/324, 339, 345, 346, 348, 377; 73/152.05–6, 73/152.08
See application file for complete search history.

(56) References Cited

U.S. PATENT DOCUMENTS 5,550,473 A * 8/1996 Klein .......................... 324/338
5,656,930 A * 8/1997 Hagiwara .................... 324/339
6,470,274 B1 * 10/2002 Mollison et al. ................ 702/7
6,493,632 B1 * 12/2002 Mollison et al. ................ 702/2
6,686,736 B2 * 2/2004 Schoen et al. .............. 324/303
6,711,502 B2 * 3/2004 Mollison et al. ................ 702/6
6,950,748 B2 * 9/2005 Liu et al. ........................ 702/7
2005/0165553 A1 * 7/2005 Jammes et al. ............... 702/11

OTHER PUBLICATIONS

Shray et al., Evaluation of Laminated Formations Using Nuclear Magnetic Resonance and Resistivity Anisotropy Measurements, Oct. 17-19, 2001, SPE 72370.*
Baardsen, H. et al., "Quantifying saturation distribution and capillary pressures using centrifuge and computer tomography". *Reservoir Characterization II*, Academic Press (1991), pp. 102-121.
Boyd, A. et al. "The Lowdown on Low-Resistivity Pay". *Oilfield Review* (Autumn 1995), pp. 4-18.
Clavier, C. et al. "Theoretical and Experimental Bases for the Dual-Water Model for Interpretation of Shaly Sands". *SPE Journal*, Paper 6859, vol. 24 (Apr. 1984), pp. 153-168.

(Continued)

*Primary Examiner*—John Barlow
*Assistant Examiner*—Toan M. Le
(74) *Attorney, Agent, or Firm*—Vincent Loccisano; Jody Lynn DeStefanis

(57) ABSTRACT

A method to estimate water saturation ($S_w$) of a thin-bedded formation is provided including (a) developing a model of anisotropy of resistivity ($R_v/R_h$) a function of water saturation ($S_{wt}$) for one or more volume fractions (either $F_{shale}$ or $F_{sand}$); (b) measuring the anisotropy of resistivity of the formation; (c) measuring the volume fraction of the formation; (d) correlating anisotropy of resistivity to the measured volume fraction of the formation using the model to estimate the water saturation (total water saturation or sand water saturation) of the formation.

10 Claims, 4 Drawing Sheets

OTHER PUBLICATIONS

Dromgoole, P. et al. "Developing and Managing Turbidite Reservoirs—Case Histories and Experiences : Results of the 1998 EAGE/AAPG Research Conference". *Petroleum Geosciences*, vol. 6 (2000), pp. 97-105.

Garrouch, A. A. "A Systematic Study Revealing Resistivity Dispersion in Porous Media". *The Log Analyst* (Jul.-Aug. 1999), pp. 271-279.

Garrouch A. A. et al. "The Influence of Clay Content, Salinity, Stress, and Wettability on the Dielectric Properties of Brine-Saturated Rocks: 10 Hz to 10 MHz". *Geophysics*, vol. 59 (1994), pp. 909-917.

Jing, X. D. et al. "Petrophysical Properties and Anisotropy of Sandstones under True-Triaxial Stress Conditions". *Petrophysics*, vol. 43 (Jul.-Aug. 2002), pp. 358-364.

Klein, J. D. "Saturation Effects on Electrical Anisotropy". *The Log Analyst*, (Jan.-Feb. 1996), pp. 47-49.

Klein et al. "The Petrophysics of Electrically Anisotropic Reservoirs". *The Log Analyst*, (May-Jun. 1997).

Matteson, A. et al. "NMR Relaxation of Clay-Brine Mixtures". *SPE 49008* (1998).

Page et al. "Field Example Demonstrating a Significant Increase in Calculated Gas-in-Place: An Enhanced Shaly Sand Reservoir Characterization Model Utilizing 3DEX™ Multicomponent Induction Data". *SPE 71724* (2001).

Revil, A. et al. "Electrical Conductivity in Shaly Sands with Geophysical Applications". *J. Geophys. Res.*, vol. 103, 10B (1998), pp. 23925-23936.

Ruth, D. W. et al. "Measurement and Interpretation of Centrifuge Capillary Pressure Curves-the-SCA Survey Data". *The Log Analyst* (Sep.-Oct. 1995), pp. 21-33.

Sen, P. N. et al. "Electrical Conduction in Clay Bearing Sandstones at Low and High Salinities". *J. Appl. Phys.*, vol. 63 (1988), pp. 44832-44840.

Shray et al. "Evaluation of Laminated Formations Using Nuclear Magnetic Resonance and Resistivity Anisotropy Measurements". *SPE 72370* (2001), pp. 1-17.

Waxman, M. H. et al. "Electrical Conductivities in Oil-Bearing Shaly Sands". *SPE J*, vol. 8 (1968), pp. 107-382.

Worthington, P. F. "The Evolution of Shaly-Sand Concepts in Reservoir Evaluation". *The Log Analyst*, vol. 26 (1985), pp. 23-40.

Worthington, P. F. "Recognition and Evaluation of Low Resistivity Pay". *Petroleum Geoscience*, vol. 6, (2000), pp. 77-92.

Yu et al. "Enhanced Evaluation of Low Resistivity Reservoirs Using Multi-Component Induction Log Data". *Petrophysics*, vol. 42, (2001), pp. 611-623.

\* cited by examiner

DETERMINING WATER SATURATION FOR OIL BEARING THIN-BEDDED FORMATION HAVING ANISOTROPIC RESISTIVITY

RELATED APPLICATION

The present patent application claims priority to U.S. Provisional Patent Application No. 60/503,112, filed Sep. 15, 2003, incorporated by reference herein in its entirety.

FIELD OF THE INVENTION

The present invention relates to determining water saturation from resistivity measurements and, more particularly, to determining water saturation from anisotropic resistivity measurements in oil bearing thin-bedded formations.

BACKGROUND

Thinly laminated formations can hold significant hydrocarbon reservoirs. Often such formations are anisotropic and exhibit the classical "Low Resistivity Pay" (see Boyd et al., "The lowdown on low-resistivity pay," *Oilfield Review*, Autumn 1995, pages 4-18 and Worthington, "Recognition and evaluation of low resistivity pay," *Petroleum Geoscience*, 2000, Volume 6, pages 77-92, incorporated by reference herein in their entireties). The cause of this very large anisotropy of resistivity (i.e., larger than 3) is likely due to the presence of water bearing thin beds (shale layers for example) and oil bearing sand layers (see Klein, "Saturation effects on electrical anisotropy," *The Log Analyst*, January-February 1996, pages 47-49 and Klein et al., "The petrophysics of electrically anisotropic reservoirs," *The Log Analyst*, May-June 1997, incorporated by reference herein in their entireties).

Conventional techniques to measure water saturation in thin bed laminates (i.e. in the presence of anisotropic resistivity) are generally in two categories:

Models Using Horizontal Resistivity Only:

By taking into account the effect of shale upon resistivity one can derived a shaly-sand equation to compute $S_w$. Numerous equations have been proposed such as Waxman-Smits, Indonesian etc. At least 19 equations have been published. A good review can be found in: Worthington, P. F., The Evolution of Shaly-Sand Concepts in Reservoir Evaluation, The Log Analyst, 26, pp. 2340, 1985 (incorporated by reference herein in its entirety).

Models Using Vertical and Horizontal Resistivity:

Following the work done by Klein (1996) and Klein et al. (1997), Shray et al. (see Shray et al., "Evaluation of laminated formations using nuclear magnetic resonance and resistivity anisotropy measurements," SPE 72370, 2001, incorporated by reference herein in its entirety) proposed an algorithm for water saturation computation in thin-bedded formations, where the inputs are the horizontal resistivity, the vertical resistivity, the fine grained volumetric fraction (from NMR) and the water resistivity. In this approach, the thin-bed is seen as a bi-modal system composed of coarse grain layers and fine grain layers. If the horizontal and vertical resistivity and the amount of fine grain material are known, then the resistivity of the coarse grain and fine grain layer may be calculated. Then the amount of water in each layer may be determined using Archie's law. Consequently, the total amount of water may be determined.

These conventional methods are multi-step inversions requiring knowledge of formation water resistivity and porosity. These inversions are complicated and difficult to transform into real time field answer products.

Accordingly, it is an object of the present invention to provide a method to determine water saturation in thin bed formations from anisotropic resistivity measurements.

Another object of the present invention is to provide a method that directly computes water saturation from the vertical and horizontal resistivity without requiring the determination of porosity of the sand and shale layers, the water resistivity.

SUMMARY OF THE INVENTION

The present inventors have discovered that because anisotropy of resistivity is induced by the difference of saturation between the sand layer (oil bearing) and the fine grain layers (water bearing), anisotropy of resistivity is inversely proportional to total water saturation ($S_{wt}$) (i.e., anisotropy of resistivity increases with a decrease in $S_{wt}$). The use of resistivity parallel ($R_h$) and transverse ($R_v$) to the bedding planes and an accurate volume of fine grain (i.e., a fine grained-shale fraction measurement) provides more accurate $S_{wt}$ values and a simpler determination of $S_{wt}$ than conventional methods.

Accordingly, in one embodiment of the present invention, a method to estimate water saturation ($S_w$) of a thin-bedded formation under investigation is disclosed, comprising: (a) developing a model of anisotropy of resistivity ($R_v/R_h$) a function of total water saturation ($S_{wt}$) for one or more volume fractions (F), wherein the volume fraction is selected from the group consisting of shale volume fraction ($F_{shale}$) or sand volume fraction ($F_{sand}$); (b) measuring the anisotropy of resistivity ($R_v/R_h$) of the formation under investigation; (c) measuring the volume fraction of the formation under investigation, wherein the volume fraction is selected from the group consisting of shale volume fraction ($F_{shale}$) or sand volume fraction ($F_{sand}$); and (d) correlating anisotropy of resistivity to said volume fraction of the formation under investigation using the model to estimate the total water saturation ($S_{wt}$) of the formation under investigation. If the model is developed for one or more shale volume fractions ($F_{shale}$) and the measured volume fraction of the formation under investigation is the shale volume fraction ($F_{sand}$), the model takes the form $$\frac{R_v}{R_h} = 1 + a + bS_{wt} + cS_{wt}^2 + \frac{d}{(S_{wt} - e)^2}$$

where, $$a = \frac{2F_{shale} - 4F_{shale}^2 + F_{shale}^3}{F_{shale} - 1}, b = \frac{2F_{shale}^2}{F_{shale} - 1},$$

$$d = F_{shale} - 3F_{shale}^2 + 3F_{shale}^3 - F_{shale}^4, \text{ and } e = F_{shale}.$$

One skilled in the art would recognize that either the shale fraction or the sand fraction may be measured and a simple relationship ($F_{shale}+F_{sand}=1$) can be used to determine the fraction volume of interest.

In a second embodiment of the present invention, a method to estimate sand water saturation ($S_{wsand}$) of a thin-bedded formation under investigation is disclosed, comprising: (a) developing a model of anisotropy of resistivity ($R_v/R_h$) a function of total water saturation ($S_{wsand}$) for one or more volume fractions (F), wherein the volume fraction is selected from the group consisting of shale volume fraction ($F_{shale}$) or sand volume fraction ($F_{sand}$); (b) measuring the anisotropy of resistivity ($R_v/R_h$) of the formation under investigation; (c) measuring the volume fraction of the formation under investigation, wherein the volume fraction is selected from the group consisting of shale volume fraction ($F_{shale}$) or sand volume fraction ($F_{sand}$); (d) correlating anisotropy of resistivity to the volume fraction of the formation under investigation using the model to estimate the sand water saturation ($S_{wsand}$) of the formation under investigation. If the model is based on one or more shale volume fractions ($F_{shale}$) and the measured volume fraction of the formation under investigation is the shale volume fraction ($F_{shale}$), then the model takes the form $$\frac{\rho_v}{\rho_h} = 1 + a + bS_{wt} + cS_{wt}^2 + \frac{d}{(S_{wt} - e)^2}, \text{ where}$$

$$a = \frac{2F_{shale} - 4F_{shale}^2 + F_{shale}^3}{F_{shale} - 1}, b = \frac{2F_{shale}^2}{F_{shale} - 1},$$

$$d = F_{shale} - 3F_{shale}^2 + 3F_{shale}^3 - F_{shale}^4, e = F_{shale} \text{ and}$$

$$S_{wsand} = \frac{S_{wt} - F_{shade}}{F_{sand}}.$$

A visual representation of these models may be developed to assist in the evaluation of the formation. The anisotropy of resistivity may be measured using using 3D resistivity logging tools, resistivity logging tools, or high resistivity imagers. Likewise, volume fractions may be measured using NMR techniques, high resolution resistivity imager, spectroscopy techniques, or gamma ray techniques.

The main difference between the conventional algorithms and the model presented herein is the knowledge of water resistivity, porosity and the fact the present technique is a single step algorithm while the others requires four steps of computation. Accordingly, the ratio of vertical resistivity to horizontal resistivity may be directly correlated with volume fractions to determine water saturation. For thinly laminated sand-shale sequence at irreducible water saturation, the present technique can generate a quick answer at the well site. Accordingly, the use of 3D resistivity measurement combined with a fine grain-shale fraction measurement (NMR or Gamma Ray) can provide a good thin-bed evaluation methodology, and increase significantly the value of thin-bedded reservoirs.

It is noted that the terms "thinly laminated" and "thin-bedded" formations are intended to refer to formations having lamination smaller than the resolution of the logging tool used to measure anisotropy of resistivity.

Further features and applications of the present invention will become more readily apparent from the figures and detailed description that follows.

DETAILED DESCRIPTION OF THE INVENTION

Figure 1:
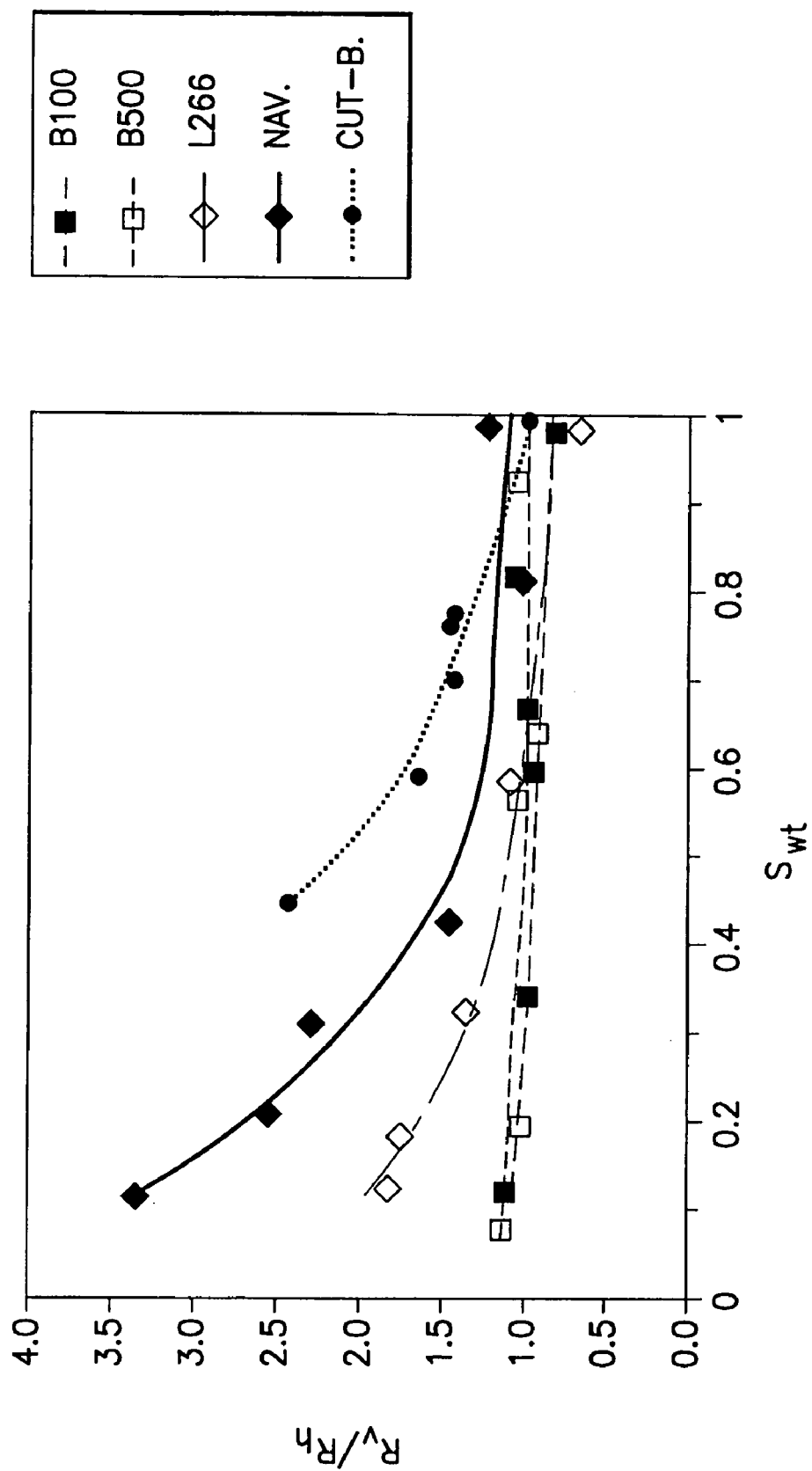
FIG. 1 is a graph depicting the ratio between vertical and horizontal resistivity and total water saturation.

FIG. 1 illustrates the dependence of the anisotropy of resistivity on water saturation for various formations (Berea, Navajo, Cutbank, and Lyons). When $S_{wt}$ decreases, the ratio between vertical and horizontal resistivity increases for laminated formations (Navajo, Cutbank, and Lyons). The highest increase is seen for the Navajo sandstone where the anisotropy of resistivity increases from 1.2 to 3.4 when the water saturation decreases from 100% to 10%. The anisotropy remained constant for the two Berea sandstones that are homogeneous. In addition, anisotropy appears only when $S_{wt}$ is significantly low (around 30% to 40%).

Figure 2:
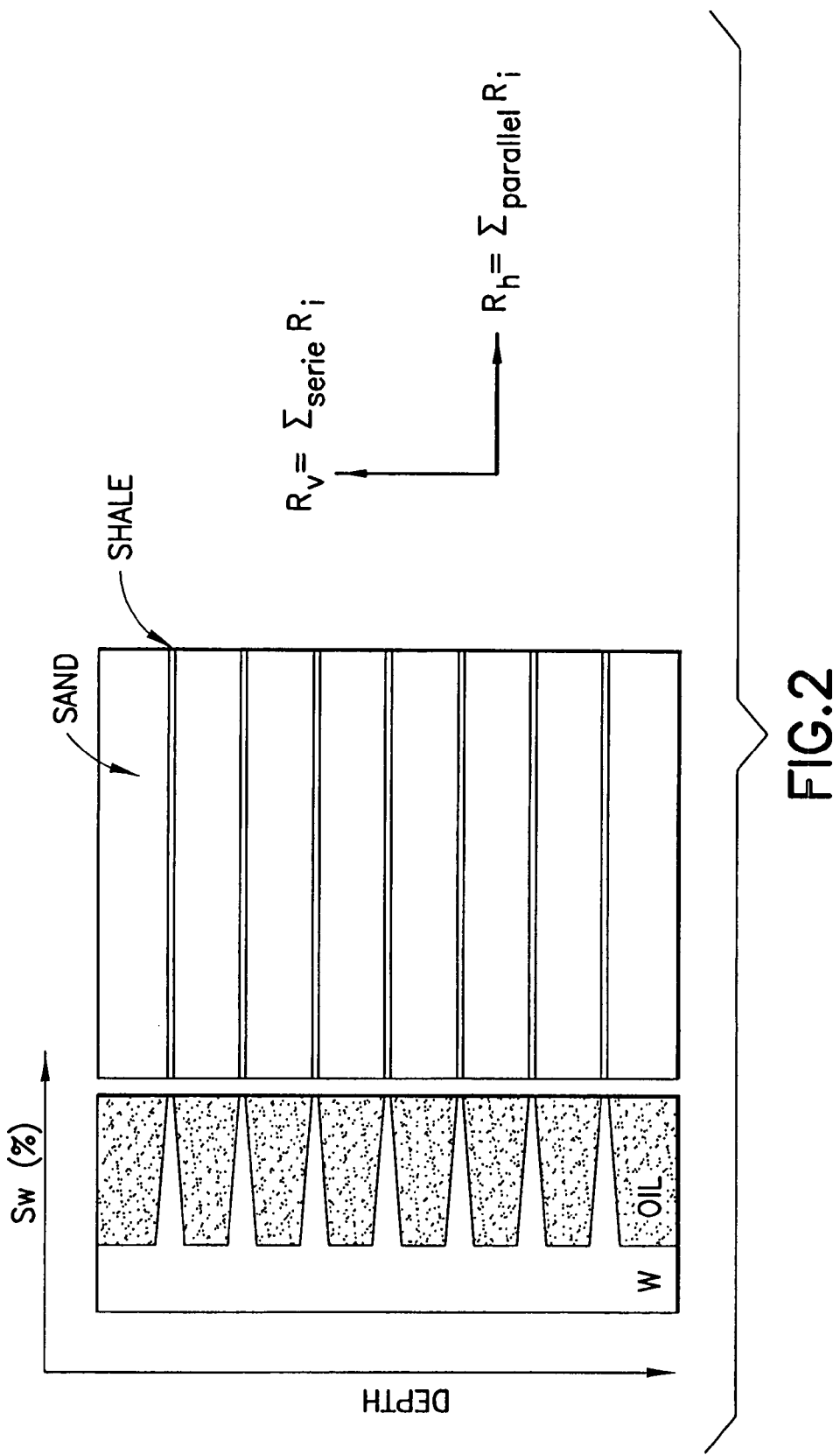
FIG. 2 is a schematic showing anisotropy of resistivity in a laminated formation.

The variation of the ratio $R_v/R_h$ when $S_{wt}$ decreases is attributable to the differential of saturation between the fine grain layer-shale (water bearing) and the coarse grain-sand layer (oil bearing) (see Klein (1996) and Klein et al. (1997)). Accordingly, laminated sandstones are isotropic when the core is close to fully water saturated and become anisotropic when $S_w$ is closer to irreducible water saturation, as explained in FIG. 2. As the capillary pressure increases in the laminated formation, the oil enters the coarse grain layer but not the fine grain layer. Because the layer resistivities are summed in series for the vertical resistivity and in parallel for the horizontal resistivity, induced anisotropy is present. Such induced anisotropy has been observed in some oilfields (Page et al., "Field example demonstrating a significant increase in calculated gas-in-place: An enhanced shaly sand reservoir characterisation model utilizing 3DEX™ multi-component induction data," SPE 71724, 2001 and Yu et al., "Enhanced evaluation of low resistivity reservoir using multi-component induction log data," *Petrophysics*, 2001, Volume 42, pages 611-623, incorporated by reference herein in their entireties), but rarely in the laboratory. The cause of this anisotropy is not fundamentally intrinsic but is linked with the fact that the fine grain layers hold the water and the coarse grain layers are filled with oil.

Using this knowledge, a method is disclosed herein that allows a direct computation of $S_w$ from the vertical resistivity, horizontal resistivity and fine grain-shale fraction only, where the fine grain-shale layers have irreducible water saturation equal to 1. The model assumes first that the system is a bi-modal system composed of coarse grain-sand layer and fine grain-shale layer only. The second assumption is that the resistivity of the two layers follows Archie's law; each layer is isotropic and that the water resistivity is the same in both layers. Consequently:

$$R_{sand} = R_w \cdot \phi_{sand}^{-m_{sand}} \cdot S_{wsand}^{-n_{sand}} \quad (1)$$

$$R_{shale} = R_w \cdot \phi_{shale}^{-m_{shade}} \cdot S_{wshale}^{-n_{shale}} \quad (2)$$

The vertical and horizontal resistivities of a layered system are calculated using Equations (4) and (5).

$$R_v = F_{shale} \cdot R_{shale} + F_{sand} \cdot R_{sand} \quad (3)$$

$$R_h = \frac{R_{shale} \cdot R_{sand}}{F_{shale} \cdot R_{sand} + F_{sand} \cdot R_{shale}} \quad (4)$$

$$F_{sand} + F_{shale} = 1 \quad (5)$$

where R and F are the resistivity and volume fractions, respectively, for the coarse grain-sand layer and the fine grain-shale layer.

If the cementation and saturation exponent of both layers are assumed to be equal to 2, the ratio between the horizontal and vertical resistivity is:

$$\frac{R_v}{R_h} = 1 - 2F_{shale} + 2F_{shale}^2 + F_{shale} \cdot \frac{S_{wsand}^2 \cdot \phi_{sand}^2}{S_{wshale}^2 \cdot \phi_{shale}^2} - \quad (6)$$

$$F_{shale}^2 \cdot \frac{S_{wsand}^2 \cdot \phi_{sand}^2}{S_{wshale}^2 \cdot \phi_{shale}^2} + F_{shale}^2 \cdot \frac{S_{wshale}^2 \cdot \phi_{shale}^2}{S_{wsand}^2 \cdot \phi_{sand}^2} - F_{shale}^2 \cdot \frac{S_{wshale}^2 \cdot \phi_{shale}^2}{S_{wsand}^2 \cdot \phi_{sand}^2}$$

If the fine grain-shale layer is fully saturated with brine ($S_{wshale}=1$), then the porosity and saturation of the coarse grain-sand layer may be rewritten as functions of the bulk properties and the fine grain-shale properties as follows:

$$\phi_{sand} = \frac{\phi_T - F_{shale} \cdot \phi_{shale}}{F_{sand}} \quad (7)$$

$$S_{wsand} = \frac{\phi_t \cdot S_{wt} - F_{shale} \cdot S_{wshale} \cdot \phi_{shale}}{F_{sand} \cdot \phi_{sand}} \quad (8)$$

$$= \frac{\phi_t \cdot S_{wt} - F_{shale} \cdot \phi_{wshale}}{F_{sand} \cdot \phi_{sand}}$$

If it is assumed that the fine grain-shale layer porosity and the total bulk porosity of the stack are very close ($\phi_{shale} \cong \phi_t$), then the anisotropy of resistivity and the sand water saturation can be expressed as:

$$\frac{R_v}{R_h} = 1 + \frac{2F_{shale} - 4F_{shale}^2 + F_{shale}^3}{F_{shale} - 1} + \frac{2 \cdot F_{shale}^2}{F_{shale} - 1} S_w - \quad (9a)$$

$$\frac{F_{shale}}{F_{shale} - 1} S_{wt}^2 + \frac{F_{shale} - 3F_{shale}^2 + 3F_{shale}^3 - F_{shale}^4}{(S_{wt} - F_{shale})^2}$$

$$S_{wsand} = \frac{S_{wt} - F_{shale}}{F_{sand}} \quad (9b)$$

The general form of this equation is:

$$\frac{R_v}{R_h} = 1 + a + bS_{wt} + cS_{wt}^2 + \frac{d}{(S_{wt} - e)^2} \quad (10)$$

where:

$$a = \frac{2F_{shale} - 4F_{shale}^2 + F_{shale}^3}{F_{shale} - 1} \quad (11a)$$

$$b = \frac{2F_{shale}^2}{F_{shale} - 1} \quad (11b)$$

$$c = -\frac{F_{shale}}{F_{shale} - 1} \quad (11c)$$

$$d = F_{shale} - 3F_{shale}^2 + 3F_{shale}^3 - F_{shale}^4 \quad (11d)$$

$$e = F_{shale} \quad (11e)$$

The solution of the equation when the shale resistivity is less than the oil bearing sand resistivity is found to be:

$$S_{wt} = F_{shale} + \sqrt{F_{shale}^2 + \frac{1}{2F_{shale}} \cdot (\alpha - \sqrt{\beta})} \quad (12)$$

where α and β are:

$$\alpha = \frac{R_V}{R_H} - 1 + F_{shale}\left(3 - 4F_{shale} - \frac{R_V}{R_H}\right) \quad (13a)$$

$$\beta = (F_{shale} - 1)^2 \cdot \left(1 - 4F_{shale} + 4F_{shale}^2 - \frac{R_V}{R_H}\right) \cdot \left(1 - \frac{R_V}{R_H}\right) \quad (13b)$$

The water saturation in the sand can be computed from Equations (9b) and (12).

Figure 3A:
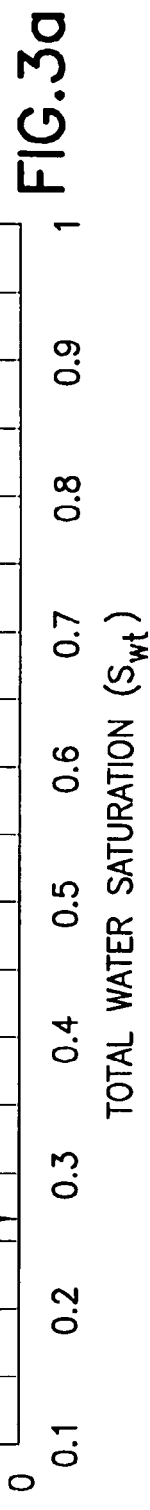
FIGS. 3(a) and 3(b) are graphs showing visual embodiments of the present invention.
Figure 3B:
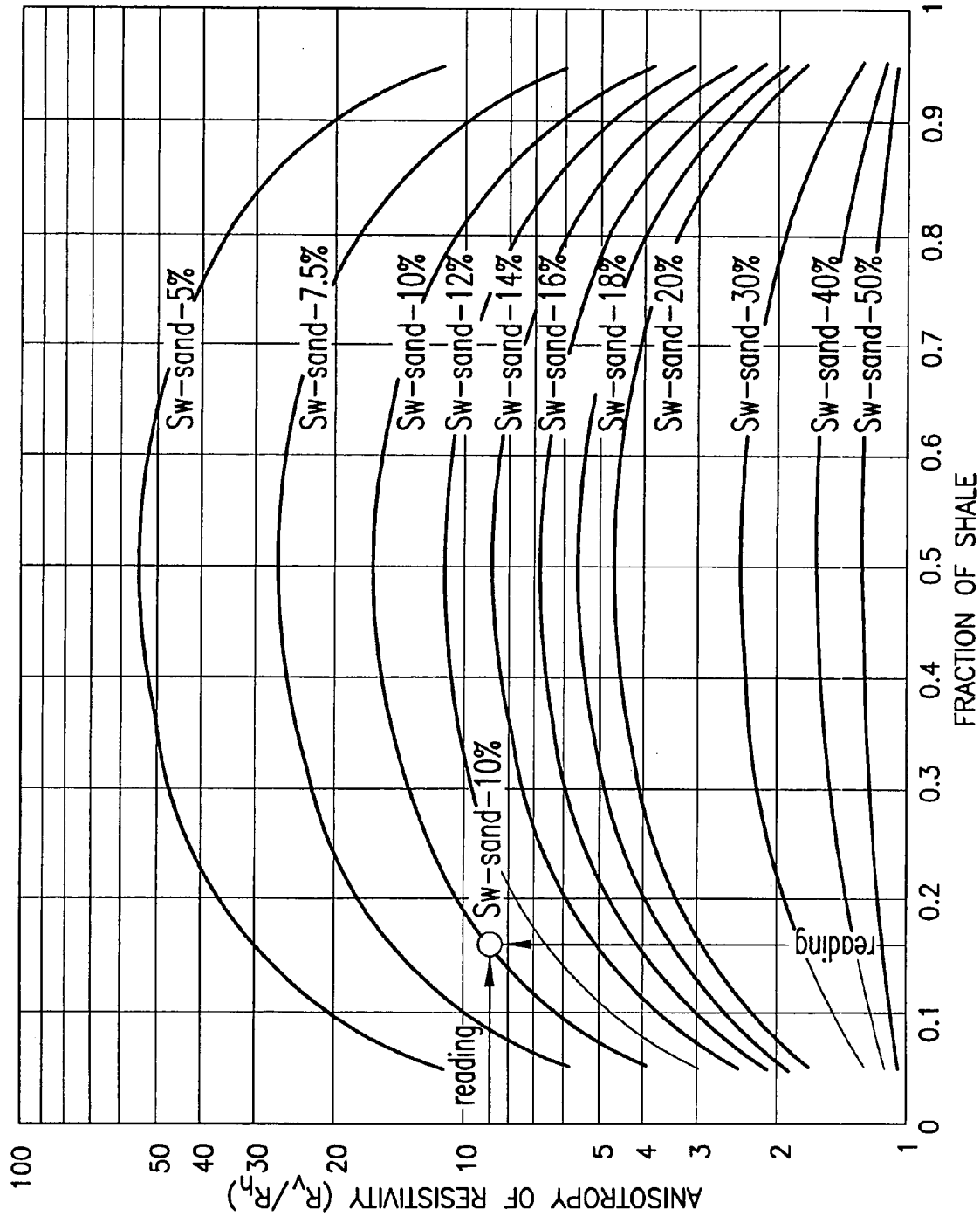

The relationship of Equation (12) can be shown graphically, see FIGS. 3(a) and 3(b). As shown in FIG. 3(a), a non-linear relationship between anisotropy of resistivity and water saturation can be developed for various volume fractions, in this case shale or fine grain fraction using the models above. Then a measurement of the anisotropy of resistivity and volume fraction of each layer type a thin-bedded formation may be obtained. Using these various curves and the measured anisotropy and volume fractions, the water saturation may be estimated. A similar approach may be used in employing the visual embodiment of FIG. 3(b) which shows a non-linear relationship between anisotropy of resistivity and volume fraction for various sand water saturations. One skilled in the art would appreciate that a visual determination is not required, so long as the models describing the non-linear relationship curves are known.

Using either the model or the visual embodiments of the model, for each shale fraction ($F_{shale}$), a direct correlation from anisotropy of resistivity ($R_v/R_h$) to water saturation can be made. Volume fractions (either shale (fine grain) fraction or sand (coarse grain) fraction) can be measured using any technique known in the art, including, but not limited to, NMR techniques, high resolution resistivity imager, spectroscopy techniques, and gamma ray techniques. Likewise, anisotropy of resistivity can be measured using various techniques, including, but not limited to, 3D resistivity logging tools, resistivity logging tools (such as Schlumberger's AIT™ or HRLA™), and high resistivity imagers (such as Schlumberger's FMI™ or OBMI™).

While the invention has been described herein with reference to certain examples and embodiments, it will be evident that various modifications and changes may be made to the embodiments described above without departing from the scope and spirit of the invention as set forth in the claims.

What is claimed is:

1. A method to estimate total water saturation ($S_{wt}$) of a thin-bedded formation under investigation, comprising:

a. expressing anisotropy of resistivity as $R_v/R_h$, wherein $R_v$ is the vertical resistivity and $R_h$ is the horizontal resistivity and wherein $R_v/R_h$ is a function of total water saturation ($S_{wt}$) for one or more shale volume fractions ($F_{shale}$), and assuming the cementation and saturation exponent of the shale and sand layers is equal to 2, the fine-grain shale is fully saturated with brine, and the fine grain-shale layer porosity and the total bulk porosity of the stack are very close;

b. measuring the anisotropy of resistivity of said formation under investigation;

c. measuring the shale volume fraction of said formation under investigation; and d. wherein said method is used to estimate the total water saturation ($S_{wt}$) of said formation under investigation by correlating anisotropy of resistivity to said shale volume fraction of said formation, and produce water saturation data in a tangible form.

2. The method of claim 1, wherein said anisotropy of resistivity is expressed as $$\frac{R_v}{R_h} = 1 + a + bS_{wt} + cS_{wt}^2 + \frac{d}{(S_{wt} - e)^2} \text{ where:}$$

$$a = \frac{2F_{shale} - 4F_{shale}^2 + F_{shale}^3}{F_{shale} - 1},$$

$$b = \frac{2F_{shale}^2}{F_{shale} - 1}, d = F_{shale} - 3F_{shale}^2 + 3F_{shale}^3 - F_{shale}^4, \text{ and } e = F_{shale}.$$

3. The method of claim 2, wherein developing said method includes developing a visual representation of said method.

4. The method of claim 1, wherein measuring anisotropy of resistivity is performed using 3D resistivity logging tools, resistivity logging tools, or high resistivity imagers.

5. The method of claim 1, wherein measuring volume fraction is NMR techniques, high resolution resistivity imager, spectroscopy techniques, or gamma ray techniques.

6. A method to estimate sand water saturation ($S_{wsand}$) of a thin-bedded formation under investigation, comprising:

a. expressing anisotropy of resistivity as $R_v/R_h$, wherein $R_v$ is the vertical resistivity and $R_h$ is the horizontal resistivity and wherein $R_v/R_h$ is a function of sand water saturation ($S_{wsand}$) for one or more shale volume fractions (F), and assuming the cementation and saturation exponent of the shale and sand layers is equal to 2, the fine-grain shale is fully saturated with brine, and the fine grain-shale layer porosity and the total bulk porosity of the stack are very close;

b. measuring the anisotropy of resistivity ($R_v/R_h$) of said formation under investigation;

c. measuring the shale volume fraction of said formation under investigation, and d. wherein the method is used to estimate the sand water saturation ($S_{wsand}$) by correlating anisotropy of resistivity to said shale volume fraction of said formation, and produce water saturation data in a tangible form.

7. The method of claim 6, wherein said anisotropy of resistivity is expressed as $$\frac{R_v}{R_h} = 1 + a + bS_{wt} + cS_{wt}^2 + \frac{d}{(S_{wt} - e)^2}$$

$$\left[\left[\frac{\rho_v}{\rho_h} = 1 + a + bS_{wt} + cS_{wt}^2 + \frac{d}{(S_{wt} - e)^2}\right]\right]$$

where:

$$a = \frac{2F_{shale} - 4F_{shale}^2 + F_{shale}^3}{F_{shale} - 1},$$

$$b = \frac{2F_{shale}^2}{F_{shale} - 1},$$

$$d = F_{shale} - 3F_{shale}^2 + 3F_{shale}^3 - F_{shale}^4, \text{ and } e = F_{shale}. \text{ and}$$

$$S_{wsand} = \frac{S_{wt} - F_{shale}}{F_{sand}}.$$

8. The method of claim 7, wherein developing said model includes developing a visual representation of said method.

9. The method of claim 6, wherein measuring anisotropy of resistivity is performed using 3D resistivity logging tools, resistivity logging tools, or high resistivity imagers.

10. The method of claim 6, wherein measuring volume fraction is NMR techniques, high resolution resistivity imager, spectroscopy techniques, or gamma ray techniques.

* * * * *